United States Patent
Suk et al.

(10) Patent No.: US 10,508,168 B2
(45) Date of Patent: Dec. 17, 2019

(54) THERMOPLASTIC POLYMER, METHOD OF PREPARING THERMOPLASTIC POLYMER, AND THERMOPLASTIC POLYMER COMPOSITION INCLUDING THERMOPLASTIC POLYMER

(71) Applicant: LG CHEM, LTD., Seoul (KR)

(72) Inventors: Jae Min Suk, Daejeon (KR); Young Hwan Jeong, Daejeon (KR); Young Min Kim, Daejeon (KR); Jin Hyoung Lee, Daejeon (KR); Su Jeong Han, Daejeon (KR); Yoo Vin Kim, Daejeon (KR); Sun Haeng Chung, Daejeon (KR)

(73) Assignee: LG CHEM, LTD., Seoul (KR)

(*) Notice: Subject to any disclaimer, the term of this patent is extended or adjusted under 35 U.S.C. 154(b) by 105 days.

(21) Appl. No.: 15/552,238

(22) PCT Filed: Nov. 28, 2016

(86) PCT No.: PCT/KR2016/013816
§ 371 (c)(1),
(2) Date: Aug. 18, 2017

(87) PCT Pub. No.: WO2017/105003
PCT Pub. Date: Jun. 22, 2017

(65) Prior Publication Data
US 2018/0072834 A1    Mar. 15, 2018

(30) Foreign Application Priority Data

Dec. 17, 2015  (KR) .................. 10-2015-0180635
Dec. 17, 2015  (KR) .................. 10-2015-0180637
Dec. 17, 2015  (KR) .................. 10-2015-0180638

(51) Int. Cl.
*C08F 220/64*  (2006.01)
*C08F 236/12*  (2006.01)
(Continued)

(52) U.S. Cl.
CPC .............. *C08F 279/04* (2013.01); *C08F 2/18* (2013.01); *C08F 136/06* (2013.01);
(Continued)

(58) Field of Classification Search
CPC .... C08F 212/10; C08F 220/42; C08F 220/44; C08F 220/46; C08F 220/62; C08F 220/64; C08F 236/02; C08F 236/04; C08F 236/12
See application file for complete search history.

(56) References Cited

U.S. PATENT DOCUMENTS 2,868,755 A * 1/1959 Medalia ................ C08F 236/10
524/813
3,825,625 A   7/1974 Kudo et al.
(Continued)

FOREIGN PATENT DOCUMENTS

CN   104492340 A   4/2015
CN   104661999 A   5/2015
(Continued)

OTHER PUBLICATIONS

Computer-generated English-language translation of JP H11-71479 A.*
(Continued)

*Primary Examiner* — Vu A Nguyen (57) ABSTRACT

The present invention relates to a thermoplastic polymer, a method of preparing the thermoplastic polymer, and a thermoplastic polymer composition including the thermoplastic polymer. More particularly, the present invention provides a thermoplastic polymer reducing the amount of gas generated
(Continued)

in high-temperature extrusion and injection-molding processes to improve surface gloss and definition of a resin and provides superior latex stability when a chain-type fatty acid or a salt thereof having a specific branch group or functional group is included as an emulsifier during shell polymerization of a thermoplastic polymer including a core-shell structure, a method of preparing the thermoplastic polymer, and a thermoplastic polymer composition including the thermoplastic polymer.

18 Claims, 2 Drawing Sheets

(51) Int. Cl.

| | | |
|---|---|---|
| C08L 25/12 | (2006.01) | |
| C08F 279/04 | (2006.01) | |
| C08F 210/12 | (2006.01) | |
| C08F 212/08 | (2006.01) | |
| C08F 2/18 | (2006.01) | |
| C08J 3/12 | (2006.01) | |
| C08L 9/00 | (2006.01) | |
| C08F 136/06 | (2006.01) | |

(52) U.S. Cl.
CPC .......... *C08F 210/12* (2013.01); *C08F 212/08* (2013.01); *C08J 3/12* (2013.01); *C08L 9/00* (2013.01); *C08L 25/12* (2013.01); *C08L 2207/04* (2013.01); *C08L 2207/53* (2013.01)

(56) References Cited

U.S. PATENT DOCUMENTS

| | | |
|---|---|---|
| 5,756,619 A | 5/1998 | Phillips, Jr. |
| 6,344,509 B1 | 2/2002 | Mizutani |
| 2002/0173570 A1 | 11/2002 | Takeda et al. |

FOREIGN PATENT DOCUMENTS

| | | | | |
|---|---|---|---|---|
| GB | 592913 | 10/1947 | | |
| GB | 832822 | 4/1960 | | |
| GB | 832822 A | 4/1960 | | |
| JP | S53-145859 | 12/1978 | | |
| JP | S61233044 A | 10/1986 | | |
| JP | 2786890 B2 | 8/1998 | | |
| JP | 11071479 A | * | 3/1999 | ............... C08L 7/00 |
| JP | 2000-511219 A | 8/2000 | | |
| JP | 2001-354824 A | 12/2001 | | |
| JP | 2002-146109 A | 5/2002 | | |
| JP | 2011-184501 A | 9/2011 | | |
| JP | 2014-177536 A | 9/2014 | | |
| JP | 2014-177537 A | 9/2014 | | |
| KR | 10-1996-0014181 A | 5/1996 | | |
| WO | WO-2015016520 A1 | * | 2/2015 | ............ C08F 279/04 |

OTHER PUBLICATIONS

International Search Report for International Patent Application No. PCT/KR2016/013816 filed on Nov. 28, 2016.
Search Report dated Oct. 10, 2018 for European Application No. 16875945.4.
1st OA issued in related Chinese application No. 201680013082.0 dated Jul. 2, 2019.

* cited by examiner

THERMOPLASTIC POLYMER, METHOD OF PREPARING THERMOPLASTIC POLYMER, AND THERMOPLASTIC POLYMER COMPOSITION INCLUDING THERMOPLASTIC POLYMER

CROSS-REFERENCE TO RELATED APPLICATIONS

This application is a U.S. National Stage of International Patent Application No. PCT/KR2016/013816 filed Nov. 28, 2016, which claims the priority benefit of Korean Patent Application No. 10-2015-0180635, filed on Dec. 17, 2015, Korean Patent Application No. 10-2015-0180637, filed on Dec. 17, 2015, and Korean Patent Application No. 10-2015-0180638, filed on Dec. 17, 2015, in the Korean Intellectual Property Office, the disclosure of which is incorporated herein by reference.

TECHNICAL FIELD

The present invention relates to a thermoplastic polymer, a method of preparing the thermoplastic polymer, and a thermoplastic polymer composition including the thermoplastic polymer. More particularly, the present invention relates to a thermoplastic polymer reducing the amount of gas generated in high-temperature extrusion and injection-molding processes to improve surface gloss and definition of a resin and provides superior latex stability when a chain-type fatty acid or a salt thereof having a specific branch group or functional group is included as an emulsifier during polymerization of a rubber polymer or during core and/or shell polymerization of a thermoplastic polymer including a core-shell structure, a method of preparing the thermoplastic polymer, and a thermoplastic polymer composition including the thermoplastic polymer.

BACKGROUND ART

Acrylonitrile-butadiene-styrene (hereinafter referred to as ABS) resin, which has stiffness and chemical resistance due to inclusion of acrylonitrile and processability and mechanical strength and aesthetically pleasing appearance due to inclusion of butadiene and styrene, is variously used in automotive parts, electrical and electronic products, office equipment, and the like. Surface gloss and definition of such ABS resin are important factors determining the quality of molded articles.

As examples of factors affecting surface gloss and definition of ABS resin, there are gas, which is generated due to a heat stabilizer, an unreactive monomer, and the like during high-temperature extrusion and injection molding processes, as well as particle size and particle distribution. Accordingly, it is required to reduce the amount of a gas generated during processing of ABS resin so as to improve surface gloss and definition of the resin. However, it is difficult to completely eliminate additives used to impart various characteristics to ABS resin and completely remove unreactive monomers during a processing process of the resin. Therefore, there is a need for a technology for particularly investigating ingredients of gas generated during processing of ABS resin, and thus, reducing a gas generation amount.

RELATED ART DOCUMENT

[Patent Document] (Patent Document 1) KR1996-0014181 A

DISCLOSURE

Technical Problem

Therefore, the present invention has been made in view of the above problems, and it is one object of the present invention to provide a thermoplastic polymer reducing the amount of gas generated in high-temperature extrusion and injection-molding processes to improve surface gloss and definition of a resin and provides superior latex stability when a chain-type fatty acid or a salt thereof having a specific branch group or functional group is included as an emulsifier during polymerization of a rubber polymer or during core and/or shell polymerization of a thermoplastic polymer including a core-shell structure.

It is another object of the present invention to provide a method of preparing the thermoplastic polymer.

It is yet another object of the present invention to provide a thermoplastic polymer composition including the thermoplastic polymer.

The above and other objects can be accomplished by the present disclosure described below.

Technical Solution

In accordance with one aspect of the present invention, provided is a thermoplastic polymer, wherein, when a rubber polymer, or a core-shell polymer including the rubber polymer as a core is polymerized, one or more of the rubber polymer and the shell includes one or selected from the group consisting of a branched chain fatty acid; a chain-type fatty acid including a functional group; and salts thereof.

The rubber polymer may be, for example, a conjugated diene-based rubbery polymer.

The core-shell polymer may include, for example, (a) a core including a conjugated diene-based rubbery polymer; and (b) a shell enclosing the core and prepared by polymerizing an aromatic vinyl compound with a vinyl cyanide compound.

The conjugated diene-based rubbery polymer may be prepared, for example, by polymerizing one or more conjugated diene-based compounds selected from the group consisting of 1,3-butadiene, 2,3-dimethyl-1,3-butadiene, 2-ethyl-1,3-butadiene, 1,3-pentadiene, isoprene, and chloroprene.

The core may be included, for example, in an amount of 30 to 80% by weight and the shell may be included, for example, in an amount of 20 to 70% by weight.

The aromatic vinyl compound may be, for example, one or more selected from the group consisting of styrene, α-methyl styrene, p-methyl styrene, o-methyl styrene, p-ethyl styrene, and vinyl toluene.

The vinyl cyanide compound may be, for example, one or more selected from the group consisting of acrylonitrile, methacrylonitrile, and ethacrylonitrile.

The branched chain fatty acid may be, for example, a chain-type fatty acid including 1 to 10 branches composed of a $C_1$ to $C_{10}$ alkyl group.

A functional group of the chain-type fatty acid including the functional group may be, for example, a hydroxyl group or an alkoxy group including a $C_1$ to $C_{10}$ alkyl group.

Each of the branched chain fatty acid or the chain-type fatty acid including the functional group may be, for example, a chain-type fatty acid having a main chain carbon number of 14 to 22.

Each of the branched chain fatty acid or the chain-type fatty acid including the functional group may be, for example, an unsaturated chain-type fatty acid having a main chain unsaturation degree of 1 to 20.

One or more selected from the group consisting of the branched chain fatty acid, the chain-type fatty acid including the functional group, and the salts thereof included in the rubber polymer may be included, for example, in an amount of 1 to 7 parts by weight based on 100 parts by weight of the rubber polymer.

One or more selected from the group consisting of the branched chain fatty acid, the chain-type fatty acid including the functional group, and the salts thereof included in the shell included in the shell may be included, for example, in an amount of 0.01 to 5 parts by weight based on 100 parts by weight of a total of the monomers included in the core and the shell.

In accordance with another aspect of the present invention, there is provided a method of preparing a thermoplastic polymer, the method including: a step of preparing a rubber polymer by polymerizing a monomer constituting a rubber; or a step of preparing a polymer having a core-shell structure by polymerizing the rubber polymer with a monomer to be grafted, wherein, when the monomer is polymerized, one or more selected from the group consisting of a branched chain fatty acid, a chain-type fatty acid including a functional group, and salts thereof is included.

The monomer constituting the rubber may be, for example, a conjugated diene-based compound.

The monomer to be grafted may include, for example, an aromatic vinyl compound and a vinyl cyanide compound.

In accordance with yet another aspect of the present invention, there is provided a thermoplastic polymer composition including the thermoplastic polymer and an aromatic vinyl compound-vinyl cyanide compound copolymer.

The thermoplastic polymer may be included, for example, in an amount of 10 to 50% by weight and the aromatic vinyl compound-vinyl cyanide compound copolymer may be included, for example, in an amount of 50 to 90% by weight.

The thermoplastic polymer composition may have, for example, a surface definition (haze) of 2.5 or less.

The thermoplastic polymer composition may have, for example, a surface gloss of 90 or more.

Advantageous Effects

As apparent from the fore-going, the present invention advantageously provides a thermoplastic polymer reducing the amount of gas generated in high-temperature extrusion and injection-molding processes to improve surface gloss and definition of a resin and provides superior latex stability when a chain-type fatty acid or a salt thereof having a specific branch group or functional group is included as an emulsifier during polymerization of a rubber polymer or during core and/or shell polymerization of a thermoplastic polymer including a core-shell structure, a method of preparing the thermoplastic polymer, and a thermoplastic polymer composition including the thermoplastic polymer.

BEST MODE

Hereinafter, the present invention is described in detail.

The present inventors confirmed that, when a resin is extruded and injection-molded at a high temperature of 200 to 270° C., a heat stabilizer generates gas, an oligomer and an unreactive monomer remain after polymerization, and an emulsifier is not easily removed in a dehydration process.

The present inventors first performed a process of selecting emulsifier candidates to substitute for a conventionally used fatty acid-based emulsifier so as to change the emulsifier among the aforementioned materials, and then selected an emulsifier having relatively high thermal stability through a boiling point test and a TGA test in accordance with the purpose of the present invention of reducing the amount of gas generated in high-temperature extrusion and injection-molding processes.

Figure 1:
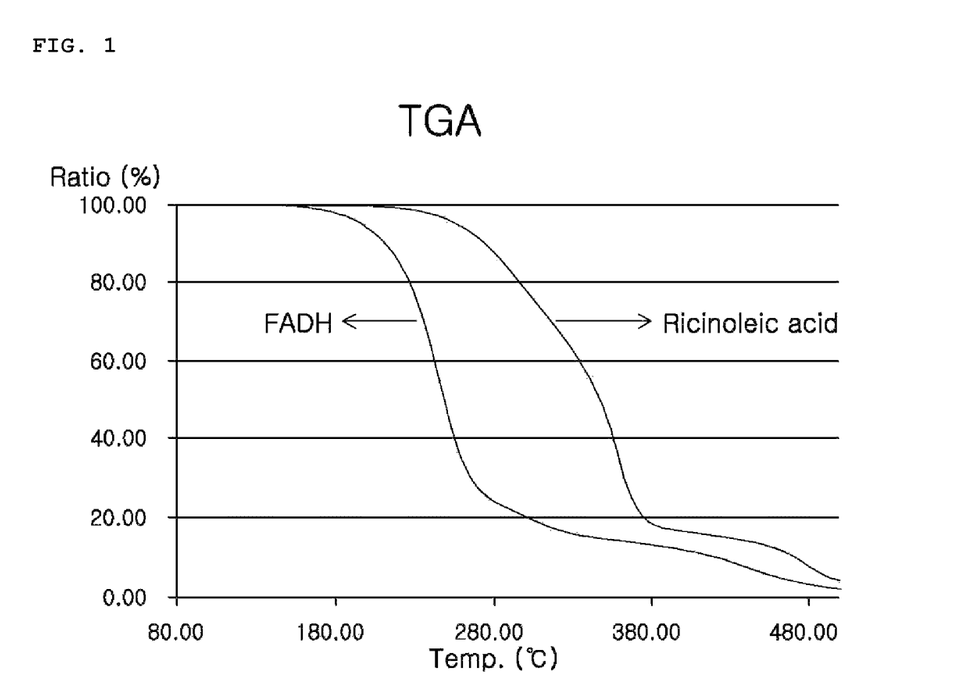
FIG. 1 is a TGA test comparison result illustrating thermal stability of ricinoleic acid and fatty acid.

FIG. 1 illustrates shows a TGA test comparison results of ricinoleic acid and fatty acid (FADH) included in a conventionally used fatty acid-based emulsifier. Examining Table 1 below in which the TGA test comparison results are summarized, thermal stability of ricinoleic acid is superior to fatty acid.

TABLE 1

| Classification | Soap | Acid |
|---|---|---|
| Ricinoleic acid | Temperature at which loss of 10% by weight occurs | 273° C. |
|  | Loss amount at 270° C. | 9% by weight |
| Fatty acid (FADH) | Temperature at which loss of 10% by weight occurs | 210° C. |
|  | Loss amount at 270° C. | 78% by weight |

Figure 2:
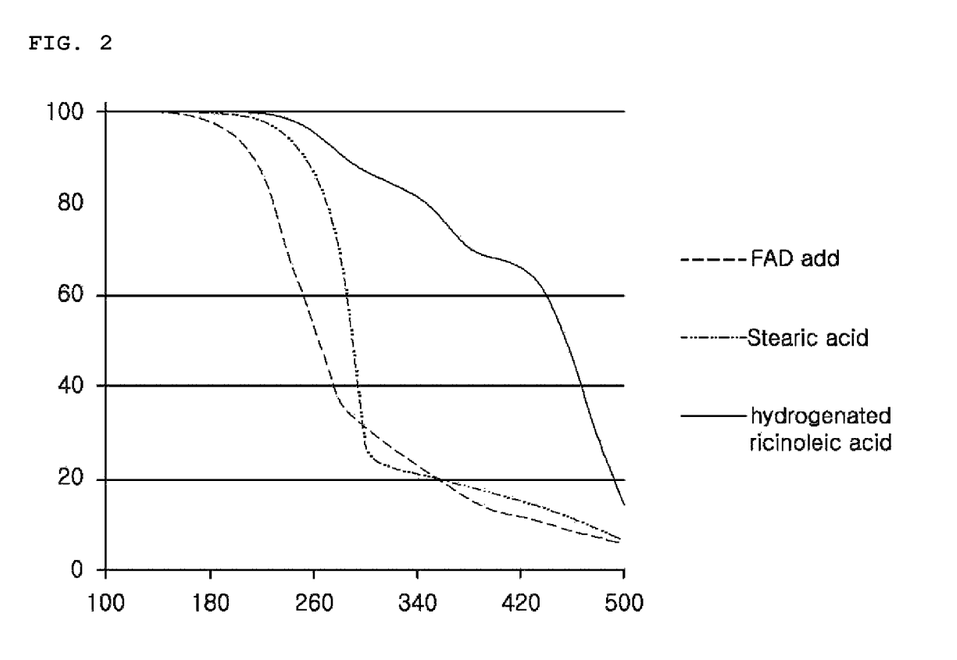
FIG. 2 is a TGA test comparison result illustrating thermal stability of hydrogenated ricinoleic acid, stearic acid and fatty acid.

FIG. 2 illustrates TGA test comparison results of hydrogenated ricinoleic acid as a chain-type fatty acid including a functional group according to the present invention, stearic acid as saturated fatty acid not including a branch group or a functional group, and fatty acid (FAD acid: mixture of palmitic acid, oleic acid, and stearic acid) included in a conventionally used fatty acid-based emulsifier. Examining Table 2 below in which the TGA test comparison results are summarized, it can be confirmed that thermal stability of hydrogenated ricinoleic acid is superior to stearic acid and fatty acid.

TABLE 2

| Classification | Temperature at which loss of 5% by weight (w/w) occurs | Temperature at which loss of 50% by weight (w/w) occurs |
|---|---|---|
| Hydrogenated ricinoleic acid | 263° C. | 455° C. |
| Stearic acid | 237° C. | 289° C. |
| Fatty acid | 198° C. | 262° C. |

Accordingly, the present inventors selected a chain-type fatty acid having a specific branch group or functional group as a new emulsifier, and confirmed that, when the emulsifier is used during polymerization of a rubber polymer or during core and/or shell polymerization of a thermoplastic polymer including a core-shell structure, surface gloss and surface definition of a resin are improved and stability of latex increases, thus completing the present invention.

Hereinafter, the thermoplastic polymer according to the present invention is described in detail.

The rubber polymer may be prepared by, for example, polymerizing a conjugated diene-based compound; and one or more selected from the group consisting of a branched chain fatty acid, a chain-type fatty acid including a functional group, and salts thereof.

The conjugated diene-based compound may be, for example, one or more selected from the group consisting of 1,3-butadiene, 2,3-dimethyl-1,3-butadiene, 2-ethyl-1,3-butadiene, 1,3-pentadiene, isoprene, and chloroprene.

The rubber polymer may be, for example, in the form of a latex in which a polymerized conjugated diene-based rubbery polymer is dispersed in water in a colloidal state.

The rubber polymer may have, for example, an average particle diameter of 1,500 to 3,500 Å, 2,000 to 3,500 Å, or 2,500 to 3,500 Å, and a gel content of 60 to 95% by weight, 65 to 90% by weight, or 70 to 90% by weight. Within this range, superior mechanical properties and property balance are exhibited.

One or more selected from the group consisting of the branched chain fatty acid, the chain-type fatty acid including the functional group, and the salts thereof may be included, for example, in an amount of 1 to 7 parts by weight, 1 to 5 parts by weight, or 1 to 3 parts by weight based on 100 parts by weight of the conjugated diene-based compound. Within this range, surface gloss and definition are superior and latex stability is excellent.

A method of preparing the rubber polymer of the present invention is characterized by including a step of polymerizing a conjugated diene-based compound; and one or more selected from the group consisting of a branched chain fatty acid, a chain-type fatty acid including a functional group, and salts thereof.

The rubber polymer may be polymerized, for example, according to an emulsion polymerization method.

The emulsion polymerization method of the rubber polymer is not specifically limited so long as it is generally used to prepare a rubber polymer.

One or more selected from the group consisting of the branched chain fatty acid, the chain-type fatty acid including the functional group, and the salts thereof may function, for example, as an emulsifier during emulsion polymerization of the rubber polymer.

The thermoplastic polymer may include, for example, a core-shell structure, wherein the shell may be prepared by polymerizing one or more selected from the group consisting of a branched chain fatty acid, a chain-type fatty acid including a functional group, and salts thereof.

As another example, the thermoplastic polymer includes a core-shell structure, wherein each of the core and the shell is prepared by polymerizing one or more selected from the group consisting of a branched chain fatty acid, a chain-type fatty acid including a functional group, and salts thereof.

The core may be, for example, the rubber polymer described above.

The thermoplastic polymer having the core-shell structure may include, for example, (a) a core including a conjugated diene-based rubbery polymer; and (b) a shell enclosing the core and prepared by polymerizing an aromatic vinyl compound with a vinyl cyanide compound.

The core may be included, for example, in an amount of 30 to 80% by weight, 40 to 75% by weight, or 50 to 70% by weight based on 100% by weight of a total content of the core, the aromatic vinyl compound, and the vinyl cyanide compound. Within this range, superior mechanical properties and surface characteristics are exhibited.

The shell, for example, may enclose the rubber polymer, i.e., the core, and may be graft-polymerized. In addition, the shell may be included, for example, in an amount of 20 to 70% by weight, 25 to 60% by weight, or 30 to 50% by weight based on 100% by weight of a total content of the rubber polymer, the aromatic vinyl compound, and the vinyl cyanide compound. Within this range, superior mechanical properties and property balance are exhibited.

The conjugated diene-based rubbery polymer of the core may be prepared, for example, by polymerizing one or more conjugated diene-based compounds selected from the group consisting of 1,3-butadiene, 2,3-dimethyl-1,3-butadiene, 2-ethyl-1,3-butadiene, 1,3-pentadiene, isoprene, and chloroprene.

The shell, for example, may enclose the core and may be prepared by graft-polymerizing the branched chain fatty acid, the chain-type fatty acid including the functional group, and the salts thereof.

The aromatic vinyl compound may be, for example, one or more selected from the group consisting of styrene, α-methyl styrene, p-methyl styrene, o-methyl styrene, p-ethyl styrene, and vinyl toluene, and the vinyl cyanide compound may be, for example, one or more selected from the group consisting of acrylonitrile, methacrylonitrile, and ethacrylonitrile.

The aromatic vinyl compound and the vinyl cyanide compound of the shell may be included, for example, in a weight ratio of 1:1 to 5:1, or 1.5:1 to 4:1, or 2:1 to 4:1.

The branched chain fatty acid may be, for example, a chain-type fatty acid including 1 to 10, 1 to 5, or 1 to 3 branches composed of a $C_1$ to $C_{10}$, $C_1$ to $C_5$, or $C_1$ to $C_3$ alkyl group.

The alkyl group constituting the branches may be, for example, a methyl group, an ethyl group, a propyl group, or an isopropyl group.

The branched chain fatty acid may be, for example, an iso-acid, an anteiso-acid, or a mixture thereof of at least one chain-type fatty acid selected from the group consisting of myristic acid, myristoleic acid, palmitic acid, stearic acid, oleic acid, linoleic acid, and nonadecylic acid.

The iso-acid refers to a structure isomer which has a main chain having a carbon atom number of (n−1) and one hydrogen of a $(n-2)^{th}$ carbon of which is substituted with a methyl group when a main chain of the branched chain fatty acid has a carbon number of (n). In addition, the anteiso-acid refers to a structure isomer which has a main chain having a carbon atom number of (n−1) and one hydrogen coupled to a $(n-3)^{th}$ carbon of which is substituted with a methyl group. As a particular example, isostearic acid, as an iso-acid of stearic acid having a main chain carbon atom number of 18, has a main chain carbon atom number of 17 and a structure wherein one hydrogen coupled to a $16^{th}$ carbon atom of the carbon atoms is substituted with a methyl group. In addition, anteisostearic acid, as an anteiso-acid of stearic acid, has a main chain carbon atom number of 17 and a structure wherein one hydrogen coupled to a $15^{th}$ carbon atom of the carbon atoms is substituted with a methyl group.

The main chain refers to an entire carbon chain (R- and C) included in a carboxyl group (R—COOH) or carboxylate group (R—COO⁻) of fatty acid unless specified otherwise in the present invention.

The functional group of the chain-type fatty acid including the functional group may be, for example, a hydroxyl group or an alkoxy group including a $C_1$ to $C_{10}$, $C_1$ to $C_5$ or $C_1$ to $C_3$ alkyl group. When the functional group is a hydroxyl group or the alkoxy group, thermal stability of an emulsifier increases, and thus, the amount of gas generated during extrusion and injection-molding is decreased. Accordingly, a resin exhibits superior surface gloss and definition.

The functional group may be, for example, a hydroxyl group, a methoxy group, an ethoxy group, or an epoxy group.

The chain-type fatty acid including the functional group may be, for example, one or more selected from the group consisting of ricinoleic acid, hydrogenated ricinoleic acid (12-hydrox octacdecanoic acid), 2-hydroxy eicosanoic acid, 3-hydroxy eicosanoic acid, 3-hydroxy octadecanoic acid, 9-hydroxy octadecanoic acid, 10-dihydroxy octadecanoic acid, 18-hydroxy octadecanoic acid, 2-hydroxy hexadecanoic acid, 3-hydroxy hexadecanoic acid, 16-hydroxy hexadecanoic acid, 14-hydroxy tetradecanoic acid, vernolic acid, 10-hydroxy octadecanoic acid, 11-hydroxy octadecanoic acid, 13-hydroxy octadecanoic acid, 14-hydroxy octadecanoic acid, 10-methoxy octadecanoic acid, 11-methoxy octadecanoic acid, 12-methoxy octadecanoic acid, 13-methoxy octadecanoic acid, 14-methoxy octadecanoic acid, 10-ethoxy octadecanoic acid, 11-ethoxy octadecanoic acid, 12-ethoxy octadecanoic acid, 13-ethoxy octadecanoic acid, 14-ethoxy octadecanoic acid, 10-isopropyl octadecanoic acid, 11-isopropyl octadecanoic acid, 12-isopropyl octadecanoic acid, 13-isopropyl octadecanoic acid, 14-isopropyl octadecanoic acid, and metal salts thereof.

The salt of each of the branched chain fatty acid and the chain-type fatty acid including the functional group may be, for example, a metal salt. Here, the metal may be, for example, an alkaline metal or an alkaline earth metal.

Each of the branched chain fatty acid and the chain-type fatty acid including the functional group may be, for example, a chain-type fatty acid having a main chain carbon number of 14 to 22, 14 to 20, or 16 to 20. Within this range, thermal stability of an emulsifier is superior, whereby a gas generation amount is reduced during extrusion and injection-processing.

Each of the branched chain fatty acid and the chain-type fatty acid including the functional group may be, for example, an unsaturated chain-type fatty acid having a main chain unsaturation degree of 1 to 20, 1 to 10, or 1 to 5. Within this range, superior latex stability and surface characteristics are exhibited.

One or more selected from the group consisting of the branched chain fatty acid, the chain-type fatty acid including the functional group, and the salts thereof included in the shell may be included, for example, in an amount of 0.01 to 5 parts by weight, 0.01 to 3 parts by weight, 0.01 to 2 parts by weight, 0.02 to 1.5 parts by weight, 0.05 to 1.5, or 0.1 to 1 part by weight based on 100 parts by weight of a total of the monomers included in the core and the shell. Within this range, surface gloss and definition are superior and latex stability is excellent.

A method of preparing the thermoplastic polymer of the present invention includes, for example, a step of preparing a core by polymerizing conjugated diene-based compound with one or more selected from the group consisting of a branched chain fatty acid, a chain-type fatty acid including a functional group, and salts thereof; and a step of preparing a polymer having a core-shell structure by graft-polymerizing an aromatic vinyl compound and vinyl cyanide compound to the core.

As another example, the method of preparing the thermoplastic polymer of the present invention includes a step of polymerizing a core; and a step of graft-polymerizing a shell to the polymerized core using one or more selected from the group consisting of a branched chain fatty acid, a chain-type fatty acid including a functional group, and salts thereof.

As another example, the method of preparing the thermoplastic polymer of the present invention includes a step of preparing a core by polymerizing a conjugated diene-based compound with one or more selected from the group consisting of the branched chain fatty acid, the chain-type fatty acid including the functional group, and the salts thereof and a step of preparing a polymer having a core-shell structure by polymerizing the core with an aromatic vinyl compound; a vinyl cyanide compound; and one or more selected from the group consisting of the branched chain fatty acid, the chain-type fatty acid including the functional group, and the salts thereof.

Each of the core polymerization and the shell graft polymerization may be performed, for example, by emulsion polymerization.

An emulsion polymerization method of the core and an emulsion graft polymerization method of the shell are not specifically limited so long as the methods are generally used to prepare an ABS resin.

The method of preparing the thermoplastic polymer may include, for example, based on 100 parts by weight of a total of the rubbery polymer latex, which is included in the core, the aromatic vinyl compound, and the vinyl cyanide compound, a step of mixing 50 to 80 parts by weight or 50 to 70 parts by weight of a rubbery polymer latex with 50 to 150 parts by weight of an aqueous medium; a first polymerization step of adding, to a resultant mixture, an emulsion mixture, which is prepared by emulsifying 20 to 50 parts by weight or 30 to 50 parts by weight of a mixture of an aromatic vinyl compound and a vinyl cyanide compound, 20 to 50 parts by weight of an aqueous medium, 0.01 to 5 parts by weight of a low-temperature polymerization initiator, 0.01 to 5 parts by weight of an oil-soluble polymerization initiator, and 0.01 to 10 parts by weight of an emulsifier, with 0.01 to 5 parts by weight of a redox initiator and polymerizing the same; and a second polymerization step of adding 0.01 to 1 part by weight of an oil-soluble polymerization initiator and 0.01 to 1 part by weight of a redox initiator at a polymerization conversion rate of 90 to %, 92 to 95%, or 92 to 94% during the first polymerization step and polymerizing the same.

One or more selected from the group consisting of the branched chain fatty acid, the chain-type fatty acid including the functional group, and the salts thereof may function, for example, as an emulsifier using the emulsion graft polymerization of the core and/or the shell.

A thermoplastic polymer composition of the present invention includes the thermoplastic polymer and the aromatic vinyl compound-vinyl cyanide compound copolymer.

The thermoplastic polymer composition may be, for example, in the form wherein the thermoplastic polymer is dispersed in a matrix resin composed of the aromatic vinyl compound-vinyl cyanide compound copolymer. In this case, superior impact strength and property balance are exhibited.

The aromatic vinyl compound-vinyl cyanide compound copolymer, for example, may be bulk-polymerized. In this case, superior impact strength and surface definition are exhibited.

An aromatic vinyl compound constituting the aromatic vinyl compound-vinyl cyanide compound copolymer may be, for example, one or more selected from the group consisting of styrene, α-methyl styrene, p-methyl styrene, o-methyl styrene, and vinyl toluene, and may be included in an amount of 10 to 90% by weight, 30 to 80% by weight, or 50 to 80% by weight based on the aromatic vinyl compound-vinyl cyanide compound copolymer. Within this range, superior surface definition and gloss are exhibited.

A vinyl cyanide compound constituting the aromatic vinyl compound-vinyl cyanide compound copolymer may be, for example, one or more selected from the group consisting of acrylonitrile, methacrylonitrile, and ethacrylonitrile, and may be included in an amount of 10 to 90% by weight, 20 to 70% by weight, or 20 to 50% by weight based on the aromatic vinyl compound-vinyl cyanide compound copolymer. Within this range, superior color and property balance are exhibited.

The thermoplastic polymer may be included, for example, in an amount of 10 to 50% by weight, 10 to 40% by weight, or 15 to 40% by weight based on the thermoplastic polymer composition, and the aromatic vinyl compound-vinyl cyanide compound copolymer may be included, for example, in an amount of 50 to 90% by weight, 60 to % by weight, or 60 to 85% by weight based on the thermoplastic polymer composition. Within this range, superior impact strength, surface definition, and gloss are exhibited.

The thermoplastic polymer composition may further include, for example, an additive, such as a heat stabilizer, a light stabilizer, an antioxidant, an antistatic agent, an antimicrobial agent, or a lubricant, within a range within the properties of the thermoplastic polymer composition are not affected.

The thermoplastic polymer composition may have, for example, a surface definition (haze) of 2.5 or less, 1 to 2.0, 1 to 1.5, 0.5 to 1.5, or 1.2 to 1.7. Within this range, a surface of resin is clear.

The thermoplastic polymer composition may have, for example, a surface gloss of 90 or more, 90 to 99.9, 96 to 99.9, 90 to 99, 95 to 99, or 92 to 97. Within this range, surface gloss of a resin is superior.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1-1

Rubber Polymer Core Polymerization Step 65 parts by weight of ion exchanged water, 75 parts by weight of 1,3-butadiene, 2.5 parts by weight of a ricinoleic acid soap as an emulsifier, 1.2 parts by weight of potassium carbonate ($K_2CO_3$) as an electrolyte, 0.4 parts by weight of tertiary dodecyl mercaptan (TDDM) as a molecular weight regulator, and 0.3 parts by weight of potassium persulfate ($K_2S_2O_8$) as an initiator were fed into a nitrogen-substituted polymerization reactor batchwise, and reacted at 70° C. until a polymerization conversion rate reached 30 to 40%. Subsequently, 25 parts by weight of 1,3-butadiene were continuously added thereto, and reaction was performed at 75° C. until a polymerization conversion rate reached to 60%. Subsequently, 0.2 parts by weight of potassium persulfate ($K_2S_2O_8$) were added thereto batchwise and temperature was elevated up to 82° C. Reaction was terminated at a polymerization conversion rate of 95%. As a result, a polybutadiene rubber latex (core) having an average particle diameter of 3,000 Å and a gel content of 85% by weight was obtained.

Shell Polymerization Step 60 parts by weight (based on a solid content) of the polybutadiene rubber latex (seed) polymerized in the core polymerization step; a mixture including 10 parts by weight of acrylonitrile, 30 parts by weight of styrene, 25 parts by weight of ion exchanged water, 0.12 parts by weight of t-butyl hydroperoxide, 1.0 part by weight of potassium rosinate, and 0.3 parts by weight of tertiary dodecyl mercaptan which have been mixed in a separate mixer; 0.054 parts by weight of dextrose; 0.004 parts by weight of sodium pyrophosphate; and 0.002 parts by weight of ferrous sulfate were fed into a nitrogen-substituted polymerization reactor at 70° C. over a period of three hours.

Subsequently, 0.05 parts by weight of dextrose, 0.03 parts by weight of sodium pyrophosphate, 0.001 parts by weight of ferrous sulfate, and 0.05 parts by weight of t-butyl hydroperoxide were fed into the polymerization reactor batchwise, and temperature was elevated up to 80° C. over a period of one hour, followed by terminating the reaction. As a result, an ABS graft copolymer latex having a seed-shell structure was prepared. Here, a polymerization conversion rate was 97%, a graft rate of the prepared ABS graft copolymer latex was 41%, and the content of a generated coagulum was 0.3% by weight.

Subsequently, 2 parts by weight of a 10 wt % aqueous sulfuric acid solution was added to the prepared ABS graft copolymer latex so as to solidify the ABS graft copolymer latex, followed by washing. As a result, a powder was obtained.

Thermoplastic Polymer Composition Preparation Step 27.5 parts by weight of the obtained ABS graft copolymer powder and 72.5 parts by weight of an SAN copolymer (manufactured by LG Chemistry, product name: 92HR) were fed into a mixer and mixed therein. Subsequently, a resultant mixture was melted and kneaded by means of an extruder at 200 to 250° C., thereby being pelletized. Subsequently, a specimen for measuring properties measurement was manufactured by means of an injection machine.

Example 1-2

An experiment was carried out in the same manner as in Example 1-1, except that, in the core polymerization step, 2.5 parts by weight of a hydrogenated ricinoleic acid soap (12-hydroxy octadecanoic acid soap) were added instead of 2.5 parts by weight of the ricinoleic acid soap.

Example 1-3

An experiment was carried out in the same manner as in Example 1-1, except that, in the core polymerization step, 2.5 parts by weight of an isostearic acid soap were added instead of 2.5 parts by weight of the ricinoleic acid soap.

Example 1-4

An experiment was carried out in the same manner as in Example 1-1, except that, in the core polymerization step, 2.5 parts by weight of a stearic acid soap were added instead of 2.5 parts by weight of the ricinoleic acid soap.

Comparative Example 1-1

An experiment was carried out in the same manner as in Example 1-1, except that, in the core polymerization step, 2.5 parts by weight of a FAD soap were added instead of 2.5 parts by weight of the ricinoleic acid soap.

Test Example

The properties of the thermoplastic resin composition specimen obtained according to each of Examples 1-1 to 1-4 and Comparative Example 1-1 were measured according to following methods. Results are summarized in Table 3 below.

Measurement Methods

Average particle diameter (Å): Measured according to a dynamic laser light scattering method by means of the Nicomp 370HPL instrument, manufactured by Nicomp, US.

Gel content (% by weight): A polybutadiene rubber latex was solidified using a dilute acid or a metal salt and then washed. The washed polybutadiene rubber latex was dried in a 60° C. vacuum oven for 24 hours. An obtained rubber lump was cut into small pieces with scissors. 1 g of the rubber piece was placed in 100 g of toluene and stored in a dark room for 48 hours, followed by separating into a sol and a gel. The separated sol and gel were respectively dried, and a gel content was measured according to Equation 1 below:

$$\text{Gel content(\% by weight)} = \frac{\text{Weight of insoluble matter(gel)}}{\text{Weight of sample}} \times 100 \quad [\text{Equation 1}]$$

Gas generation amount (ppm): Volatile organic compound (VOC) ingredients generated from 1 g of a resin composition sample were analyzed under conditions of 250° C. and one hour using HS-GC/MSD.

Surface definition (reflection haze): The reflection haze of a specimen was measured by adding a gloss value of 17 to 19° and 21 to 23° according to a standard measurement method, ASTM E430.

Surface gloss (45°): The surface gloss of a specimen was measured at an angle of 45° according to a standard measurement method, ASTM D528.

Impact strength (Notched Izod impact strength, kgf·m/m): Impact strengths of ¼" and ⅛" specimens were measured according to a standard measurement method, ASTM D256.

Coagulum content (% by weight): The weight of a coagulum generated in a reaction tank, the weight of total rubber, and the weight of monomers were measured, and a coagulum content was calculated according to Equation 2 below:

$$\text{Solid coagulum content(\%)} = \frac{\text{Weight of coagulum generated in reaction tank(g)}}{\text{Weight of total rubber and monomers(g)}} \times 100 \quad [\text{Equation 2}]$$

Octanol-water partition coefficient (soap acid form, Log P): According to the data center standard quality manual DCQM-01 of Korea Research Institute of Standards and Science (KRISS), each fatty acid was slow-stirred three times and an octanol-water partition coefficient thereof was measured. A log P value was calculated according to Equation 3 below:

$$\text{Log } P = \text{Log}(Kow) \quad [\text{Equation 3}]$$

Kow=(Amount of substances dissolved in 1-octanol)/(amount of substances dissolved in distilled water)

TABLE 3

| Classification | Examples | | | | Comparative Example |
|---|---|---|---|---|---|
| | 1-1 | 1-2 | 1-3 | 1-4 | 1-1 |
| Gas generation amount | 3,100 | 2,800 | 3,600 | 3,300 | 4,800 |
| Definition | 1.3 | 1.1 | 1.4 | 1.2 | 2.7 |
| Gloss | 97.4 | 98.2 | 95.4 | 96.4 | 89.1 |
| Impact strength (¼") | 36.7 | 36.2 | 35.8 | 35.5 | 35.5 |
| Impact strength (⅛") | 47.2 | 47.5 | 46.9 | 46.2 | 46.4 |
| Coagulum content | 0.03 | 0.05 | 0.10 | 0.09 | 0.12 |
| Octanol-water partition coefficient | 6.2 | 6.4 | 8.7 | 8.2 | 8.3 |

As shown in Table 3, it can be confirmed that, in the cases of Examples 1-1 to 1-4 according to the present invention, a gas generation amount is remarkably reduced, and surface definition, gloss, and impact strength are excellent, compared to Comparative Example 1-1 in which a conventional FAD emulsifier is used. In addition, it can be confirmed that, in the cases of Examples 1-1 to 1-4 according to the present invention, emulsifying power between the vinyl cyanide compound, as a hydrophilic monomer, and the aromatic vinyl compound, as a hydrophobic monomer, is controlled due to a low octanol-water partition coefficient, and thus, a coagulum content is low, whereby latex stability is improved.

Example 2-1

Core Polymerization 65 parts by weight of ion exchanged water, 75 parts by weight of 1,3-butadiene as a monomer, 1.5 parts by weight of a potassium rosinate as an emulsifier, 0.8 parts by weight of a potassium oleate, 0.8 parts by weight of potassium carbonate ($K_2CO_3$) as an electrolyte, 0.3 parts by weight of tertiary dodecyl mercaptan (TDDM) as a molecular weight regulator, and 0.3 parts by weight of potassium persulfate ($K_2S_2O_8$) as a polymerization initiator were fed into a nitrogen-substituted polymerization reactor (autoclave) batchwise and reacted therein at a reaction temperature of 70° C. until a polymerization conversion rate reached 30 to 40% Subsequently, 25 parts by weight of 1,3-butadiene were added thereto batchwise and 0.3 parts by weight of a potassium rosinate were added thereto, followed by elevating temperature up to 82° C. Reaction was terminated at a polymerization conversion rate of 95% As a result, a polybutadiene rubber latex (core) having an average particle diameter of 3,000 to 3,500 Å was obtained.

Shell Polymerization Step

A mixture including 60 parts by weight (based on a solid content) of the polybutadiene rubber latex (core) polymerized in the core polymerization step and 100 parts by weight of ion exchanged water; a mixture including 30 parts by weight of styrene, 10 parts by weight of acrylonitrile, 25 parts by weight of ion exchanged water, 0.6 parts by weight of a low-temperature polymerization initiator (2,2'-azobis-(2,4-dimethyl-4-methoxyvaleronitrile)), 0.6 parts by weight of t-butyl hydroperoxide, 1.0 part by weight of a ricinoleic acid soap, and 0.3 parts by weight of tertiary dodecyl mercaptan (TDDM) which have been mixed in a separate mixer; 0.027 parts by weight of dextrose; 0.002 parts by weight of sodium pyrophosphate; and 0.001 parts by weight of ferrous sulfate were continuously fed into a nitrogen-substituted polymerization reactor at 70° C. over a period of two hours while performing polymerization (first polymerization step).

At a time point at which the continuous feeding of the first polymerization step was completed, i.e., at a polymerization conversion rate of 92 to 95%, 0.05 parts by weight of dextrose, 0.03 parts by weight of sodium pyrophosphate, 0.001 parts by weight of ferrous sulfate, and 0.05 parts by weight of t-butyl hydroperoxide were fed into the reactor batchwise, and temperature was elevated up to 80° C. over a period of one hour such that polymerization was performed. The polymerization was terminated, whereby an ABS graft copolymer latex was prepared (second polymerization step). Here, a polymerization conversion rate was 98%.

Thermoplastic Polymer Composition Preparation Step

The prepared ABS graft copolymer latex was solidified with an aqueous sulfuric acid solution and washed, thereby obtaining a powder. 27.5 parts by weight of the obtained powder and 72.5 parts by weight of an SAN copolymer (manufactured by LG Chemistry, product name: 92HR) were mixed in a mixer, and then pelletized by means of an extruder. Subsequently, a specimen for measuring properties was manufactured by means of an injection machine.

Example 2-2

An experiment was carried out in the same manner as in Example 2-1, except that, in the shell polymerization step, 1.0 part by weight of a hydrogenated ricinoleic acid soap (12-hydroxy octadecanoic acid soap) was added instead of 1.0 part by weight of the ricinoleic acid soap.

Example 2-3

An experiment was carried out in the same manner as in Example 2-1, except that, in the shell polymerization step, 1.0 part by weight of an isostearic acid soap was added instead of 1.0 part by weight of the ricinoleic acid soap.

Example 2-4

An experiment was carried out in the same manner as in Example 2-1, except that, in the shell polymerization step, 1.0 part by weight of a vernolic acid soap was added instead of 1.0 part by weight of the ricinoleic acid soap.

Comparative Example 2-1

An experiment was carried out in the same manner as in Example 2-1, except that, in the shell polymerization step, 1.0 part by weight of an emulsifier mixture including a palmitic acid soap, a stearic acid soap, and an oleic acid soap was added instead of 1.0 part by weight of the ricinoleic acid soap.

The properties of the thermoplastic polymer composition specimen obtained according to each of Examples 2-1 to 2-4 and Comparative Example 2-1 were measured according to the following test examples.

Results are summarized in Table 4 below:

TABLE 4

| Classification | Examples | | | | Comparative Example |
|---|---|---|---|---|---|
| | 2-1 | 2-2 | 2-3 | 2-4 | 2-1 |
| Gas generation amount | 3,670 | 3,300 | 4,100 | 3,880 | 4,930 |
| Definition | 1.2 | 1.2 | 1.7 | 1.4 | 2.8 |
| Gloss | 94.1 | 95.3 | 92.7 | 93.6 | 89.5 |
| Impact strength | 35.7 | 36.2 | 34.9 | 34.2 | 34.7 |
| Coagulum content | 0.03 | 0.06 | 0.1 | 0.07 | 0.1 |
| Latex stability | 0.03 | 0.02 | 0.05 | 0.04 | 0.06 |
| Octanol-water partition coefficient | 6.2 | 6.4 | 8.7 | 6.7 | 8.3 |

As shown in Table 4, it can be confirmed that, in the cases of Examples 2-1 to 2-4 according to the present invention, gas generation amount is reduced and surface definition, gloss and impact strength are excellent. In addition, it can be confirmed that, in the cases of Examples 2-1 to 2-4 according to the present invention, emulsifying power between the vinyl cyanide compound, as a hydrophilic monomer, and the aromatic vinyl compound, as a hydrophobic monomer, is controlled due to a low octanol-water partition coefficient, and thus, a coagulum content is low, whereby latex stability is improved.

On the other hand, it can be confirmed that, in the case of Comparative Example 2-1 in which a conventional emulsifier mixture, which included saturated fatty acids excluding a branch group or functional group, was used, a gas generation amount is excessive, all of surface definition, gloss, and impact strength are poor, a coagulum content is high due to a high octanol-water partition coefficient, and latex stability is poor.

Example 3-1

Rubber Polymer Core Polymerization Step 65 parts by weight of ion exchanged water, 75 parts by weight of 1,3-butadiene, 2.5 parts by weight of a ricinoleic acid soap as an emulsifier, 1.2 parts by weight of potassium carbonate ($K_2CO_3$) as an electrolyte, 0.4 parts by weight of tertiary dodecyl mercaptan (TDDM) as a molecular weight regulator, and 0.3 parts by weight of potassium persulfate ($K_2S_2O_8$) as an initiator were fed into a nitrogen-substituted polymerization reactor batchwise and reacted therein at a reaction temperature of 70° C. until a polymerization conversion rate reached 30 to 40%. Subsequently, 25 parts by weight of 1,3-butadiene were continuously added thereto and reacted therein at 75° C. until a polymerization conversion rate reached 60% Subsequently, 0.2 parts by weight of potassium persulfate ($K_2S_2O_8$) were added to the reactor batchwise and temperature was elevated up to 82° C. Reaction was terminated at a polymerization conversion rate of 95% As a result, a polybutadiene rubber latex (core) having an average particle diameter of 3,000 Å and a gel content of 85% by weight was obtained.

Shell Polymerization Step 60 parts by weight (based on a solid content) of the polybutadiene rubber latex (core) polymerized in the core polymerization step; a mixture including 10 parts by weight of acrylonitrile, 30 parts by weight of styrene, 25 parts by weight of ion exchanged water, 0.12 parts by weight of t-butyl hydroperoxide, 1.0 part by weight of a ricinoleic acid soap, and 0.3 parts by weight of tertiary dodecyl mercaptan which have been mixed in a separate mixer; 0.054 parts by weight of dextrose; 0.004 parts by weight of sodium pyrophosphate; and 0.002 parts by weight of ferrous sulfate were fed into a nitrogen-substituted polymerization reactor at 70° C. over a period of three hours.

After completion of the feeding, 0.05 parts by weight of dextrose, 0.03 parts by weight of sodium pyrophosphate, 0.001 parts by weight of ferrous sulfate, 0.05 parts by weight of t-butyl hydroperoxide were fed into the polymerization reactor batchwise, and temperature was elevated up to 80° C. over a period of one hour. This reaction was terminated, thereby preparing an ABS graft copolymer latex having a seed-shell structure. Here, a polymerization conversion rate was 97%, a graft rate of the prepared ABS graft copolymer latex was 41%, and the content of a generated coagulum was 0.3% by weight.

Subsequently, 2 parts by weight of a 10 wt % aqueous sulfuric acid solution were added to the prepared ABS graft copolymer latex so as to solidify ABS graft copolymer latex, followed by washing. As a result, a powder was obtained.

Thermoplastic Polymer Composition Preparation Step 27.5 parts by weight of the obtained ABS graft copolymer powder and 72.5 parts by weight of an SAN copolymer (manufactured by LG Chemistry, product name: 92HR) were fed into a mixer and mixed therein. Subsequently, a resultant mixture was melted and kneaded at 200 to 250° C. by means of an extruder, thereby being pelletized. Subsequently, a specimen for measuring properties measurement was manufactured by means of an injection machine.

Example 3-2

An experiment was carried out in the same manner as in Example 3-1, except that, in the core polymerization step, 2.5 parts by weight of a hydrogenated ricinoleic acid soap (12-hydroxy octadecanoic acid soap) were added instead of 2.5 parts by weight of the ricinoleic acid soap and, in the shell polymerization step, 1.0 part by weight of a hydrogenated ricinoleic acid soap (12-hydroxy octadecanoic acid soap) was added instead of 1.0 part by weight of the ricinoleic acid soap.

Example 3-3

An experiment was carried out in the same manner as in Example 3-1, except that, in the core polymerization step, 2.5 parts by weight of an isostearic acid soap were added instead of 2.5 parts by weight of the ricinoleic acid soap and, in the shell polymerization step, 1.0 part by weight of an isostearic acid soap was added instead of 1.0 part by weight of the ricinoleic acid soap.

Example 3-4

An experiment was carried out in the same manner as in Example 3-1, except that, in the core polymerization step, 2.5 parts by weight of a stearic acid soap were added instead of 2.5 parts by weight of the ricinoleic acid soap and, in the shell polymerization step, 1.0 part by weight of a stearic acid soap was added instead of 1.0 part by weight of the ricinoleic acid soap.

Comparative Example 3-1

An experiment was carried out in the same manner as in Example 3-1, except that, in the core polymerization step, 2.5 parts by weight of a FAD soap were added instead of 2.5 parts by weight of the ricinoleic acid soap and, in the shell polymerization step, 1.0 part by weight of a FAD soap was added instead of 1.0 part by weight of the ricinoleic acid soap.

The properties of the thermoplastic resin composition specimen obtained according to each of Example 3-1 to 3-4 and Comparative Example 3-1 were measured as in the test examples described above. Results are summarized in Table 5 below:

TABLE 5

| Classification | Examples | | | | Comparative Example |
|---|---|---|---|---|---|
| | 3-1 | 3-2 | 3-3 | 3-4 | 3-1 |
| Gas generation amount | 2,800 | 2,200 | 3,200 | 2,600 | 4,700 |
| Definition | 1.2 | 0.9 | 1.3 | 1.1 | 2.7 |
| Gloss | 98.4 | 99.2 | 96.2 | 97.7 | 89.2 |
| Impact strength (¼") | 36.7 | 36.9 | 35.5 | 36.1 | 35.7 |
| Impact strength (⅛") | 43.6 | 43.2 | 43.0 | 43.4 | 42.2 |
| Coagulum content | 0.03 | 0.03 | 0.08 | 0.06 | 0.13 |
| Octanol-water partition coefficient | 6.2 | 6.4 | 8.7 | 8.2 | 8.3 |

As shown in Table 5, it can be confirmed that, in the cases of Examples 3-1 to 3-4 according to the present invention, a gas generation amount is remarkably reduced, and surface definition, gloss, and impact strength are excellent, compared to Comparative Example 3-1 in which a conventional FAD emulsifier is used. In addition, it can be confirmed that, in the cases of Examples 3-1 to 3-4 according to the present invention, emulsifying power between the vinyl cyanide compound, as a hydrophilic monomer, and the aromatic vinyl compound, as a hydrophobic monomer, is controlled due to a low octanol-water partition coefficient, and thus, a coagulum content is low, whereby latex stability is improved.

In conclusion, the present invention uses the characteristics that, since a chain-type fatty acid-based emulsifier exhibits superior thermal stability when the emulsifier has a specific branch group or functional group, a gas generation amount is reduced when a resin composition is extruded and injection-molded. That is, the present inventors confirmed that, when a chain-type fatty acid salt having a specific branch group or functional group is used during polymerization of a rubber polymer or during core and/or shell polymerization of a thermoplastic polymer including a core-shell structure, surface gloss and surface definition of a resin composition are improved and a thermoplastic polymer exhibiting increased latex stability and a thermoplastic polymer composition including the thermoplastic polymer may be realized.

The invention claimed is:

1. A thermoplastic rubber polymer comprising one or more selected from the group consisting of:
    an unsaturated branched chain fatty acid with a main chain unsaturation degree of 1 to 20;
    an unsaturated chain-type fatty acid with a main chain unsaturation degree of 1 to 20 and comprising a functional group;
    a salt of the branched chain fatty acid, and
    a salt of the fatty acid comprising the functional group, wherein the functional group is a hydroxyl group or a C1-C10-alkoxy group.

2. The thermoplastic polymer according to claim 1, wherein the rubber polymer is a conjugated diene-based rubbery polymer.

3. The thermoplastic polymer according to claim 1, wherein the polymer comprises (a) a core comprising a conjugated diene-based rubbery polymer; and (b) a shell enclosing the core and prepared by polymerizing an aromatic vinyl compound with a vinyl cyanide compound.

4. The thermoplastic polymer according to claim 2, wherein the conjugated diene-based rubbery polymer is prepared by polymerizing one or more conjugated diene-based compounds selected from the group consisting of 1,3-butadiene, 2,3-dimethyl-1,3-butadiene, 2-ethyl-1,3-butadiene, 1,3-pentadiene, isoprene, and chloroprene.

5. The thermoplastic polymer according to claim 3, wherein the core is comprised in an amount of 30 to 80% by weight and the shell is comprised in an amount of 20 to 70% by weight.

6. The thermoplastic polymer according to claim 3, wherein the aromatic vinyl compound is one or more selected from the group consisting of styrene, α-methyl styrene, p-methyl styrene, o-methyl styrene, p-ethyl styrene, and vinyl toluene.

7. The thermoplastic polymer according to claim 3, wherein the vinyl cyanide compound is one or more selected from the group consisting of acrylonitrile, methacrylonitrile, and ethacrylonitrile.

8. The thermoplastic polymer according to claim 1, wherein the branched chain fatty acid is a chain-type fatty acid comprising 1 to 10 branches composed of a C1 to C10 alkyl group.

9. The thermoplastic polymer according to claim 1, wherein one or more selected from the group consisting of the branched chain-type fatty acid, the chain-type fatty acid comprising the functional group, and the salts thereof comprised in the rubber polymer is comprised in an amount of 1 to 7 parts by weight based on 100 parts by weight of the rubber polymer.

10. The thermoplastic polymer according to claim 3, wherein one or more selected from the group consisting of the branched chain fatty acid, the chain-type fatty acid comprising the functional group, and the salts thereof comprised in the shell is comprised in an amount of 0.01 to 5 parts by weight based on 100 parts by weight of a total of monomers comprised in the core and the shell.

11. A method of preparing a thermoplastic polymer, the method comprising:
    a step of preparing a rubber polymer by polymerizing a monomer constituting a rubber; or a step of preparing a polymer having a core-shell structure by polymerizing the rubber polymer with a grafting monomer,
    wherein the monomer or the rubber polymer is polymerized with one or more selected from the group consisting of:
    an unsaturated branched chain fatty acid with a main chain unsaturation degree of 1 to 20;
    an unsaturated chain-type fatty acid with a main chain unsaturation degree of 1 to 20 and comprising a functional group;
    a salt of the branched chain fatty acid, and
    a salt of the fatty acid comprising the functional group.

12. The method according to claim 11, wherein the monomer constituting the rubber is a conjugated diene-based compound.

13. The method according to claim 11, wherein the grafting monomer comprises an aromatic vinyl compound and a vinyl cyanide compound.

14. A thermoplastic polymer composition, comprising the thermoplastic polymer according to claim 1 and an aromatic vinyl compound-vinyl cyanide compound copolymer.

15. The thermoplastic polymer composition according to claim 14, wherein the thermoplastic polymer is comprised in an amount of 10 to 50% by weight and the aromatic vinyl compound-vinyl cyanide compound copolymer is comprised in an amount of 50 to 90% by weight.

16. The thermoplastic polymer composition according to claim 14, wherein the thermoplastic polymer composition has a surface definition (haze) of 2.5 or less.

17. The thermoplastic polymer composition according to claim 14, wherein the thermoplastic polymer composition has a surface gloss of 90 or more.

18. A thermoplastic polymer composition comprising:
    a thermoplastic rubber polymer comprising one or more selected from the group consisting of an unsaturated branched chain fatty acid with a main chain unsaturation degree of 1 to 20, an unsaturated chain-type fatty acid, a salt of the branched chain fatty acid, and a salt of the fatty acid comprising the functional group, wherein the functional group is a hydroxyl group or a C1-C10-alkoxy group; and
    an aromatic vinyl compound-vinyl cyanide compound copolymer.

* * * * *